F. R. PARKER.
SELF CLEANING ELECTRICAL PROTECTIVE APPARATUS.
APPLICATION FILED JULY 31, 1908.
968,395.
Patented Aug. 23, 1910.
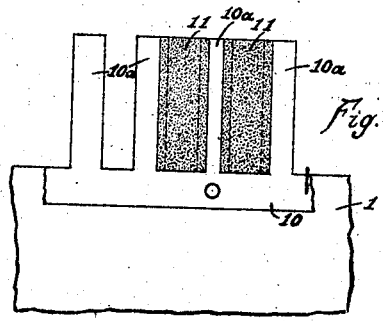
Fig. 3.
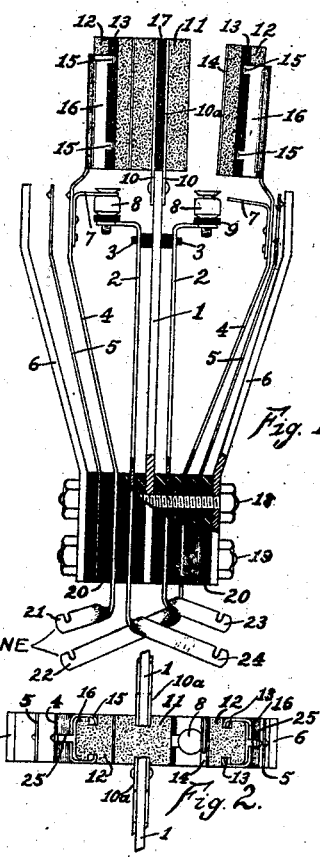
Fig. 1.
Fig. 2.
WITNESSES:
Bert G. Cable.
Freeman Barney.
INVENTOR
Frederick R. Parker

UNITED STATES PATENT OFFICE.

FREDERICK R. PARKER, OF CHICAGO, ILLINOIS.

SELF-CLEANING ELECTRICAL PROTECTIVE APPARATUS.

968,395.　　Specification of Letters Patent.　　Patented Aug. 23, 1910.

Application filed July 31, 1908. Serial No. 446,310.

*To all whom it may concern:*

Be it known that I, FREDERICK R. PARKER, a citizen of the United States of America, residing at Chicago, in the county of Cook and State of Illinois, have invented new and useful Self-Cleaning Electrical Protective Apparatus, of which the following is a specification, reference being had to the accompanying drawings, illustrating same.

My invention relates to electrical protective apparatus employing high-potential electricity arresters therein.

The principal objects of my invention are to provide improved means for cleaning the high-potential electricity arresters or lightning arresters of such apparatus; and to provide improved features of construction in such apparatus.

Other objects will be apparent from the following specification.

It is well known that the ordinary lightning arresters have to be cleaned considerably in order to prevent leakages therethrough, which leakages greatly decrease the efficiency of the electrical system. This cleaning generally has to be done by hand, by removing the electrodes and interposed dielectric from the apparatus, thoroughly cleaning same, and then replacing the electrodes and dielectric into the apparatus. In my present invention I provide means whereby such manual cleaning may be done away with, the arresters being automatically cleaned without the electrodes thereof being removed from the apparatus.

In the accompanying drawings Figure 1 is a plan view of a pair of duplicate sets of preferred form of protective apparatus of this invention, mounted on opposite sides of a ground plate or mounting plate, the apparatus on the left-hand side of the mounting plate being shown in set position and that on the right-hand side being shown in operated position; Fig. 2 is a top end view of Fig. 1; and Fig. 3 is a side elevation of a portion of the mounting plate and electrode mounting strips thereon, showing some of the electrodes of a series mounted along the mounting plate.

Like characters refer to like parts in the several figures.

In the drawings, 1 represents the ground plate or mounting plate, upon the opposite sides of which are mounted duplicate sets of spring members 2, 4, 5 and 6, suitably insulated from each other by insulating portions 20 20 as shown, the members 6 6 being preferably rather rigid. On the front edge of the mounting plate 1 are secured a pair of strips 10 10 of sheet metal, each strip 10 having tongue portions 10ª 10ª thereon adapted to fit in grooves 17 17 in the ground electrodes 11 11 of the apparatus, to hold these electrodes in place. Each pair of the protective apparatus comprises a middle electrode 11 suitably held in place by the tongue portions 10ª-10ª as shown, and electrodes 12 12 located on opposite sides of the electrode 11 as shown. Each electrode 12 is attached to the free end of the corresponding spring member 4, preferably as shown, said free end of spring member 4 being formed with portions 15 15 adapted to fit in grooves 13 13 in the electrode 12 and being split as at 25 so as to allow the portions 16 16 and the portions 15 15 to tightly grip the electrode and thereby hold same in place. Each electrode 12 has a dielectric 14 attached thereto to form a spark gap between the electrode 12 and the electrode 11 when the apparatus is set, as shown on the left of Fig. 1. Each spring member 2 has a heat-cartridge 8 mounted thereon and adapted to normally hold a metallic portion 7, which is attached to the corresponding spring member 4, in contact with the cartridge 8, preferably by easily fusible solder, when the apparatus is set.

When the apparatus is operated by an abnormally large current in the heat-cartridge 8, which current softens the solder and permits the portion 7 to be released from the cartridge 8, due to the tension in spring 4, the corresponding electrodes 11 and 12 are separated as shown on the right to Fig. 1. When the spring member 4 takes this operated position it makes electrical connection with an alarm circuit spring 5 and the corresponding ground member or plate 6, which closes an alarm circuit in the usual manner and grounds the corresponding spring member 4. When the spring member 4 operates to the position shown on the right of Fig. 1, it strikes against its stop 6, or against spring member 5 which strikes against the stop 6, and thereby vibrates the electrode 12 sufficiently to detach carbon dust and foreign particles therefrom and thereby clean the electrode and the dielectric attached thereto. Thus it will be seen that an abnormally large current in the circuit through the heat-cartridge, or abnormal heating in the heat cartridge produced in any desired manner, automatically cleans the corresponding lightning arrester.

The ligtning arrester may also be cleaned manually by removing the electrode 12 from its spring support or by unsoldering the portions 7 and 8 by a soldering iron and allowing the apparatus to operate. When the portions 7 and 8 are resoldered together in any suitable manner, the corresponding electrodes 11 and 12 are again brought together as shown on the left of Fig. 1, thereby being reset as a protector to the circuit. Spring members 4 4 are to be connected to the line conductors, and spring members 2 2 are to be connected to the switchboard conductors or to the instruments to be protected. The alarm springs 5 5 may be left off of the apparatus if desired, without affecting the operation thereof. An abnoramlly high voltage coming to the apparatus over a line spring 4 will pass through the corresponding electrode 12, dielectric 14, and the middle electrode 11, to the ground plate 1.

It will be seen that each pair of lightning arresters comprises a middle electrode 11 and line electrodes 12 12 on opposite sides thereof arranged when set to provide suitable spark gaps on opposite sides of the middle electrode 11. It will also be seen that the sneak-current protectors or heat-cartridges 8 8 serve as means for automatically cleaning the lightning arresters upon abnormally large currents in the main circuits. If desired, abnormally large currents may be sent over the main circuits through the heat-cartridges 8 8 to operate the apparatus and thereby clean the arresters, the apparatus then being reset by any suitable form of resetting device to condition the protectors for service.

The above description is believed to make the purposes and the operation of the apparatus clear, and it is therefore thought to be unnecessary to go into a further detailed description of the invention.

I do not wish to limit this invention to all of the particular details of construction herein shown or described, as many modifications of same may be made without departing from the scope of the appended claims. Neither do I wish to be limited to the particular heat-cartridges herein shown, as various forms of wound coils and other heat-cartridges may be used in this capacity.

What I claim as my invention is:

1. Electrical protective apparatus comprising a ground plate, sets of spring members mounted on opposite sides of the ground plate, a middle electrode mounted on the ground plate near one edge thereof, a pair of electrodes mounted on opposite sides of the middle electrode in close proximity thereto to provide suitable spark gaps therewith, the said pair of electrodes being suitably mounted on a pair of the spring members, and electrothermally-operable devices on opposite sides of the mounting plate, the operation of which moves the corresponding electrodes of the said pair away from the middle electrode for cleaning the arresters.

2. Electrical protective apparatus comprising a middle electrode and a pair of electrodes arranged on opposite sides thereof to provide suitable spark gaps, switching mechanism, and electrothermal protectors responsive to abnormally large currents therein whereby the electrodes are separated for cleaning the spark gaps and whereby the switching mechanism is suitably operated.

3. A high-potential electricity arrester comprising a middle electrode and a pair of electrodes on opposite sides thereof providing suitable spark-gaps therewith, thermally-operable mechanism associated with the arrester for separating at least one of the said electrodes of the pair from the middle electrode, upon abnormal heating, and means for then suddenly jarring the separated electrode for cleaning the arrester.

4. A high-potential electricity arrester comprising a middle electrode and a pair of electrodes on opposite sides thereof providing suitable spark-gaps therewith, an electrothermal device for each of the electrodes of the said pair for separating them from the middle electrode upon abnormal current conditions, and means for suddenly jarring a separated electrode for cleaning the arrester.

5. Electrical protective apparatus comprising a mounting plate, high-potential electricity arrester electrodes arranged on opposite sides of the mounting plate, switching mechanism, and an electrothermal device for each of the said electrodes whereby the latter are moved away from the mounting plate and whereby the switching mechanism is suitably operated, upon an abnormally large current, for purposes substantially as set forth.

6. Electrical protective apparatus comprising a mounting plate, high-potential electricity arrester electrodes on opposite sides of the mounting plate, switching mechanism, an electrothermal device for each of the said electrodes whereby the latter are moved away from the mounting plate and whereby the switching mechanism is suitably operated, upon abnormal current conditions, and means for suddenly jarring an operated electrode, for purposes substantially as set forth.

7. A high-potential electricity arrester having electrodes, an electrothermal device for separating the electrodes, and means for suddenly jarring at least one of the electrodes after they have been separated, for purposes substantially as set forth.

8. A high-potential electricity arrester having electrodes, electrothermally-operable mechanism for separating the electrodes upon an excess of current, and means for suddenly jarring at least one of the electrodes after they have been separated, for cleaning purposes.

9. A high-potential electricity arrester having electrodes, thermally-operable mechanism for separating the electrodes, and means for suddenly jarring at least one of the electrodes after they have been separated, for cleaning purposes.

10. A high-potential electricity arrester having electrodes, one of the said electrodes having a dielectric attached thereto, electro-thermally-operable mechanism for separating the electrodes upon an excess of current, and means for suddenly jarring the electrode to which the said dielectric is attached, after the electrodes have been separated, for cleaning purposes.

11. A high-potential electricity arrester having electrodes, one of the said electrodes having a dielectric attached thereto, thermally-operable mechanism for separating the electrodes, and means for suddenly jarring the electrode to which the said dielectric is attached, after the electrodes have been separated, for cleaning purposes.

12. In electrical protective apparatus, a high-potential electricity arrester having electrodes one of which is connected to a line, an electrothermal device for separating the electrodes upon an excess of electricity, and means for grounding the line after the electrodes have been separated.

13. In electrical protective apparatus, a high-potential electricity arrester having electrodes, means for separating the electrodes upon an excess of electricity, and means for establishing a ground connection after the electrodes are separated.

14. In electrical protective apparatus comprising a mounting plate carrying high-potential electricity arresters and switching mechanism on opposite sides thereof, electrothermal devices for opening the respective arresters, upon their operation, and simultaneously operating the said switching mechanism.

15. In electrical protective apparatus comprising a mounting plate carrying high-potential electricity arresters and switches on opposite sides thereof, electrothermal devices for opening the respective arresters, upon their operation, and simultaneously closing the said switches.

As inventor of the foregoing I hereunto subscribe my name in the presence of two subscribing witnesses this 29th day of July, 1908.

FREDERICK R. PARKER.

Witnesses:
FRANK J. RYAN,
R. G. PARKER.